United States Patent
Rydström et al.

(10) Patent No.: US 9,473,222 B2
(45) Date of Patent: Oct. 18, 2016

(54) TOOL FOR VERIFYING A LINE OF SIGHT MIMO/SIMO SYSTEM

(71) Applicant: Telefonaktiebolaget L M Ericsson (publ), Stockholm (SE)

(72) Inventors: Mats Rydström, Billdal (SE); Thomas Emanuelsson, Västra Frölunda (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/772,484

(22) PCT Filed: Mar. 4, 2013

(86) PCT No.: PCT/EP2013/054280
§ 371 (c)(1),
(2) Date: Sep. 3, 2015

(87) PCT Pub. No.: WO2014/135190
PCT Pub. Date: Sep. 12, 2014

(65) Prior Publication Data
US 2016/0006489 A1    Jan. 7, 2016

(51) Int. Cl.
*H04B 7/04* (2006.01)
*H04B 7/08* (2006.01)
(Continued)

(52) U.S. Cl.
CPC .............. *H04B 7/0413* (2013.01); *H04B 7/08* (2013.01); *H04B 17/391* (2015.01); *H04L 25/0228* (2013.01); *H04W 24/10* (2013.01)

(58) Field of Classification Search
CPC . H04L 25/0228; H04B 17/391; H04W 24/10
See application file for complete search history.

(56) References Cited

U.S. PATENT DOCUMENTS

| | | | |
|---|---|---|---|
| 5,901,183 A | 5/1999 | Garin et al. | |
| 8,416,759 B1 * | 4/2013 | Narasimhan | H04W 56/0035 370/344 |

(Continued)

FOREIGN PATENT DOCUMENTS

| | | |
|---|---|---|
| WO | 2005/040846 A1 | 5/2005 |
| WO | 2012/048723 A1 | 4/2012 |

OTHER PUBLICATIONS

International Search Report and Written Opinion for Application No. PCT/EP2013/054280, mailed Nov. 6, 2013, 9 pages.

(Continued)

*Primary Examiner* — Dac Ha
(74) *Attorney, Agent, or Firm* — Nicholson De Vos Webster & Elliott LLP (57) ABSTRACT

A verification device for a LOS MIMO/SIMO system which comprises a transmitter unit connected to a first and a second transmit antenna and a first receive antenna connected to a first down-converter which outputs a first down converted signal and a second receive antenna connected to a second down-converter which outputs a second down-converted signal. The first and the second receive antennas receive a first signal with reference symbols transmitted from one of said first and second transmit antennas, and the verification device obtains the phase difference between the first signal as received in the first and the second receive antennas respectively by comparing the first down-converted signal and the second down-converted signal with the reference symbols.

15 Claims, 8 Drawing Sheets

(51) Int. Cl.
*H04L 25/02* (2006.01)
*H04B 17/391* (2015.01)
*H04W 24/10* (2009.01)

(56) References Cited

U.S. PATENT DOCUMENTS

| | | | |
|---|---|---|---|
| 8,953,698 B2* | 2/2015 | Lindoff | H04B 7/0845 |
| | | | 375/267 |
| 2005/0117677 A1* | 6/2005 | Sampath | H04L 1/06 |
| | | | 375/347 |
| 2008/0219375 A1 | 9/2008 | Yun et al. | |
| 2012/0230444 A1* | 9/2012 | Ravid | H04B 7/0617 |
| | | | 375/267 |
| 2014/0286463 A1* | 9/2014 | Reingold | H04B 7/0456 |
| | | | 375/347 |

OTHER PUBLICATIONS

Xu et al., "Non-line-of-sight identification via phase difference statistics across two-antenna elements", THe Institution of Engineering and Technology, IET Communications, vol. 5, No. 13, Sep. 5, 2011, pp. 1814-1822.

Larsson et al., "Lattice Array Receiver and Sender for Spatially OrthoNormal MIMO Communication", Proc. VTC 2005, vol. 1, Jun. 2005, pp. 192-196.

International Preliminary Report on Patentability, Application No. PCT/EP2013/054280, dated Sep. 17, 2015, 8 pages.

* cited by examiner

TOOL FOR VERIFYING A LINE OF SIGHT MIMO/SIMO SYSTEM

CROSS-REFERENCE TO RELATED APPLICATIONS

This application is a National stage of International Application No. PCT/EP2013/054280, filed Mar. 4, 2013, which is hereby incorporated by reference.

TECHNICAL FIELD

The present invention relates to a tool for verifying a line of sight, LOS, MIMO/SIMO system.

BACKGROUND

Line of Sight, LOS, Multiple-Input Multiple-Output, MIMO, is a technology with the potential to drastically increase throughput in point-to-point radio communication links, e.g., microwave links used in a backhaul network. A communications system with LOS MIMO technology exploits multiple transmit and multiple receive antennas in order to increase data throughput over a radio "hop". By using more than one transmit and more than one receive antenna, MIMO technology enables the simultaneous transmission of several parallel data streams. This is in contrast to a conventional radio hop with a single transmit and a single receive antenna, where only one data stream can be transmitted over the hop at any given time and direction.

In Line-of-Sight MIMO systems, there is comprised a number of transceivers. The positions of the transceivers are fixed, and the channel between them is usually clear of obstacles, which means that in a LOS MIMO system, multipath propagation cannot be relied upon to generate the conditions necessary for the MIMO system to function in the desired manner, since very little or no multipath propagation occur. In order to verify a MIMO system, i.e. to verify that the MIMO system fulfills the conditions necessary for MIMO communication, the relative phase difference and in embodiments also gain the ratio of the propagation paths from at least one transmit antenna to the receive antennas can be examined to see that they are within acceptable ranges, although ideally the relative phase difference should be ninety degrees and the gain ratio should be zero dB.

An alternative to MIMO systems is SIMO systems, Single Input Multiple Output systems, i.e. a system which only utilizes one transmit antenna and a plurality of receive antennas. The conditions which are necessary for MIMO communication are also necessary for SIMO communication. For this reason, we will now also use the term MIMO/SIMO, indicating the alternative MIMO or SIMO.

In many LOS MIMO/SIMO systems, each antenna is connected to its own receive unit, which has its own oscillator used to down-convert the received signal to a baseband or an intermediate frequency. Thus, due to the use of "individual" oscillators, there is introduced differential phase noise in the received signal at the different antennas. Due to this differential phase noise, it is difficult to measure the phase difference of received signals at the different antennas in order to determine whether the relative phase differences between propagation paths satisfy the requirements of a LOS MIMO/SIMO radio "hop", since received phases have been corrupted by receive oscillators.

In addition to the phase differences between the signals received by the different receive antennas, the gain ration between the signals received by the different receive antennas is also of interest to measure in order to examine if the requirements of a LOS MIMO/SIMO system are fulfilled.

Thus, there exist specific requirements on a LOS system in order to enable MIMO/SIMO communication, and it can be difficult to verify that these requirements are fulfilled.

SUMMARY

It is an object to obtain a device for verifying a LOS MIMO/SIMO system, i.e. a device which can verify if the requirements for MIMO/SIMO communication via the LOS system are fulfilled.

This object is obtained by means of a verification device for verification of a LOS MIMO/SIMO system, which LOS MIMO/SIMO system comprises at least one transmitter unit connected to at least one transmit antenna. The LOS MIMO/SIMO system also comprises a first receive antenna connected to a first down-converter arranged to output a first down converted signal and a second receive antenna connected to a second down-converter arranged to output a second down-converted signal. The receive antennas are arranged to receive a first signal with reference symbols transmitted from the at least one transmit antenna, and the verification device is arranged to obtain the phase difference between the first signal as received in the first and second receive antennas respectively by comparing the first down-converted signal and the second down-converted signal with the reference symbols.

The reference symbols can be known reference symbols, i.e. a sequence of symbols which is known in advance at both the receive and the transmit side, or they can be a common reference signal created by means of the first and second down converted signals.

In embodiments, the verification device is also arranged to obtain the gain ratio between the first signal as received in the first and second antennas respectively by comparing the first down-converted signal and the second down-converted signal with the reference symbols.

Thus, by means of the verification device described above, it becomes possible to examine if the requirements of a LOS MIMO/SIMO system are fulfilled by the signals received at the receive antenna in the first and second receive chains, without having to observe those signals directly.

In embodiments, the verification device is further arranged to indicate successful verification of the LOS MIMO/SIMO system if the phase difference and/or the gain ratio are within respective ranges of allowed values, and to otherwise indicate failed verification of the LOS MIMO system.

In embodiments, the verification device comprises a communications receiver arranged to receive the output signal from the down converter in one of the receive chains as a main signal and to receive the output signal from the down converter in the other of said receive chains as a reference signal. The communications receiver comprises a first adaptive filter arranged to receive the main signal and a second adaptive filter arranged to receive the reference signal. The adaptive filters are arranged to output a first and a second filtered signal, respectively, and the communications receiver further comprises an adder for adding the first and the second filtered signals. The verification device is arranged to use the sum of the first and the second filtered signals as a common reference signal with the reference symbols.

In embodiments, the communications receiver further comprises a detector arranged to receive the common reference signal and to detect a communications signal comprised in the common reference signal. The detector is also arranged to generate an error signal by comparing the common reference signal to the detected communications signal. The transfer functions of the first and second adaptive filters are arranged to be updated by means of said error signal.

In embodiments of the verification device, the first and second filtered signals as well as the common reference signal are complex signals, and the verification device comprises a correlator unit arranged to receive the first and second filtered signals and to also receive the common reference signal. The correlator unit is further arranged to determine as a first correlation value the correlation between the first filtered signal and the common reference signal and a second correlation value as the correlation between the second filtered signal and the common reference signal.

The correlator unit is further arranged to determine the difference in phase between the first and second received signals as the difference in phase between the first and second correlation value, and to determine the ratio between the gain of the first and second received signals as the ratio in amplitude between the first and second correlation value. The correlator unit is further arranged to output the determined difference in phase between the first and second received signals as a phase difference signal, and to also output the determined ratio between the gain of the first and second received signals as a gain ratio signal.

In embodiments of the verification device, the correlator device is arranged to use the first correlation value to phase align the common reference signal with the first filtered signal and to use the first correlation value to gain align the common reference signal with the first filtered signal and to output the phase and gain aligned common reference signal as an aligned common reference signal.

In embodiments, the verification device comprises a Carrier to Interference, C/I, estimator device which is arranged to receive the first filtered signal from the first adaptive filter and the aligned common reference signal from the correlator device. The C/I estimator device is arranged to use the power of the aligned common reference signal as a carrier power value, and to determine the interference power value as the power of the difference between aligned common reference signal and the first filtered signal. The C/I estimator device is arranged to determine a C/I value as the ratio between the carrier power value and the interference power value, and to output said C/I value as a C/I signal.

In embodiments, the verification device is arranged to determine if the received C/I signal is within a range of allowable values or not, and to indicate successful verification of the LOS MIMO/SIMO system if the received C/I signal and the phase difference signal and/or the gain ratio signal are within their respective ranges of allowed values, and to otherwise output a verification report which indicates failed verification of the LOS MIMO/SIMO system.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

The verification device which will be described below is intended for the verification of a LOS MIMO/SIMO system. A MIMO system, i.e. a Multiple Input Multiple Output system comprises at least two transmit and at least two receive antennas, and a SIMO system comprises one transmit and at least two receive antennas. In the context of the number of antennas, it should be mentioned that one and the same antenna can be arranged to transmit and/or receive with dual polarization. Such an antenna is in the context of MIMO/SIMO considered as two antennas.

As stated above, the verification device is intended for the verification of a LOS MIMO/SIMO system. The term "verification" as well as the verb "verifying" are here used in order to signify checking if the conditions for MIMO/SIMO communications are as they should be or not.

Figure 1:
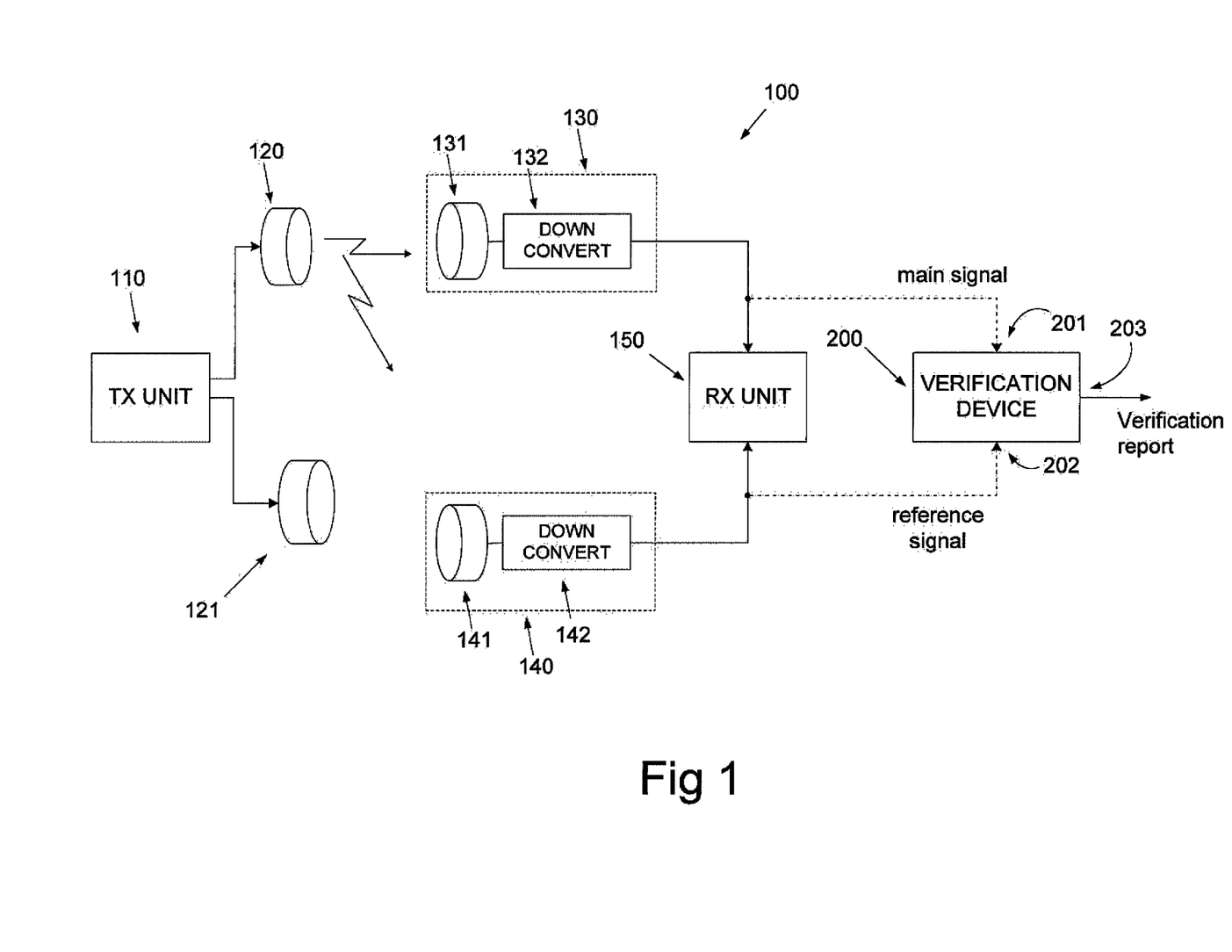
FIG. 1 shows a communications system with a verification device.

FIG. 1 shows a Line-Of-Sight, LOS, Multiple-Input Multiple-Output, MIMO, system 100 with a connected verification device 200. Thus, the system 100 comprises a transmit unit 110 arranged to generate and output a transmit signal to at least a first transmit antenna 120 and a second transmit antenna 121. A MIMO system in general comprises N>1 transmit antennas and M>1 receive antennas. However, a transmit antenna may also transmit signals on vertical and horizontal polarization. Thus a system with a single transmit antenna transmitting two signals using two polarizations may be said to be of multiple input multiple output nature. As will be realized, the system 100 can also be used as a SIMO system, if only one of the transmit antennas, e.g. the antenna 120 is utilized. In addition, although mention is made of transmit and receive antennas, it should be pointed out that the system 100 is suitably reciprocal, so that both sides of the "hop" are able to transmit and receive, although this is not explicitly described here.

At least the one transmit antenna 120 is arranged to receive a transmit signal from the transmit unit 110, and to transmit the signal over the air to at least two receive chains 130, 140. Each of the at least two receive chains 130, 140 is arranged to receive, by means of the receive antennas 131, 141, the transmitted signal, and to frequency down-convert the received signal by means of a down-converter unit 132, 142 comprised in each of the at least two receive chains 130, 140. The system 100 further comprises a receive unit 150 arranged to receive the down-converted signals from the first 130 and second 140 receive chain, respectively.

As mentioned above, a MIMO/SIMO system enables the simultaneous transmission and reception of a plurality of information signals over a radio hop. The receive unit 150 is arranged to process the received down-converted signals in order to separate out the different information signals transmitted by the transmit unit 150 and comprised in the received signals at the different receive antennas 131, 141. The receive unit 150 is also arranged to detect the different information signals. The number of independent information signals that can be transmitted over a radio hop is limited by the transmission channel, including the transmitting and the receiving equipment. The transmitting equipment, the propagation channel, and the receiving equipment together form a multidimensional propagation channel, which is commonly modeled by a matrix referred to as a MIMO/SIMO channel matrix.

When the verification device 200 is used for verification of a LOS MIMO/SIMO system, the verification comprises investigating a number of key properties of this MIMO/SIMO channel matrix in order to verify that these key properties are within acceptable ranges. Of particular importance to a LOS-MIMO/SIMO system are propagation path phase differences and, in embodiments, propagation gain ratios. By propagation path phase difference is meant the difference in phase between two signals received at two receive antennas, when both signals originate from the same transmit antenna. By propagation gain ratio is meant the ratio of the signal powers of two signals received at two receive antennas, when both signals originate from the same transmit antenna. In an ideal LOS MIMO system, with one, or in embodiments, two (spatially separated), transmit antennas and two spatially separated receive antennas, the ideal phase difference is usually 90 degrees, and the ideal gain ratio is usually 0 dB, measured on a signal originating from one of the two transmit antennas 120, 121.

The down-conversion 132, 142 in each of the at least two receive chains 130, 140 is suitably carried out by means of an oscillator comprised in each of the at least two receive chains 130, 140. The oscillator used to down-convert the received signal usually adds phase noise to the down-converted signal, and, since independent oscillators are usually used in each of the at least two receive chains 130, 140, the phase noise added to the down-converted signals will be independent between the receive chains.

In order to verify the LOS MIMO/SIMO system 100 (from now on merely referred to as "the system 100"), a verification device 200 is connected to the first 130 and second 140 receive chains. Henceforth the received and down-converted output signal from the first 130 receive chain will be referred to as the 'main signal', while the corresponding output signal of the second 140 receive chain will be referred to as the 'reference signal'. It should however be pointed out that the main and reference signals are fully interchangeable, i.e., the main signal can just as well be defined as the output signal from the second 140 receive chain, in which case the reference signal is defined as the output signal from the first receive chain 130.

When using the verification device 200 in order to verify the system 100, the verification device 200 is connected to the system 100 so that the verification device receives the main signal and the reference signal. The main signal and the reference signal are suitably complex (baseband) signals. The verification device 200 is arranged to receive the main signal on a first 201 input port of the verification device 200 and the reference signal on a second 202 input port of the verification device 200.

By signal processing of the main signal received on the first 201 input port and the reference signal received on the second 202 input port of the verification device 200, which signal processing will be described in detail below, the verification device 200 is arranged to determine a phase difference between the signals received by the at least two receive antennas 131, 141. That is, the phase difference between the received signals prior to their down-conversion in the down-converters 132, 142, is determined by means of signal processing of their corresponding down-converted signals, i.e. the main signal and the reference signal. An advantage gained by means of this is that the phase difference is not affected by phase perturbations caused by the oscillators comprised in the receive chains 130, 140. As opposed to this, a "naive" measurement device which simply determined the phase difference of the main and reference signals would not give a reliable account of the phase difference of signals received by the at least two receive antennas 131, 141, since the main signal and the reference signals are down-converted signals which are thus affected by imperfections by the local oscillators in the down-converters would not give a reliable account of the phase difference of signals received by the at least two receive antennas 131, 141.

The verification device 200 is also arranged to determine a gain difference between signals received by the at least two receive antennas 131, 141. This gain difference is determined by means of signal processing of the main and reference signals. This signal processing will also be described in detail below.

The verification device 200 is further arranged to compare the determined phase difference to a range of allowed values stored by the system, and to compare the determined gain difference to a range of allowed values. The verification device 200 is in embodiments arranged to indicate successful verification of the LOS MIMO system 100 if both the determined phase difference and the determined gain difference are within their respective ranges of allowed values, and to otherwise indicate failed verification of the LOS MIMO system 100. Indication of successful or failed verification to a user of the verification device 200 is done by means of outputting a verification report on an output port 203 of the verification device 200, which verification report preferably comprises the indication of failed or successful verification. Of course, the verification report may in embodiments comprise more detailed information such as the determined phase difference and the determined gain difference, as well as indications on how a user should modify the installation in order to achieve successful verification. The output port 203 may comprise or be connected to e.g. a display or a printer by means of which the result of the verification is given, as well as possibly further instructions or information. In other embodiments, the output port is merely connected to or comprises audio or visual means such as tone generators or LED diodes, which are used to indicate successful and/or failed verification.

Figure 2:
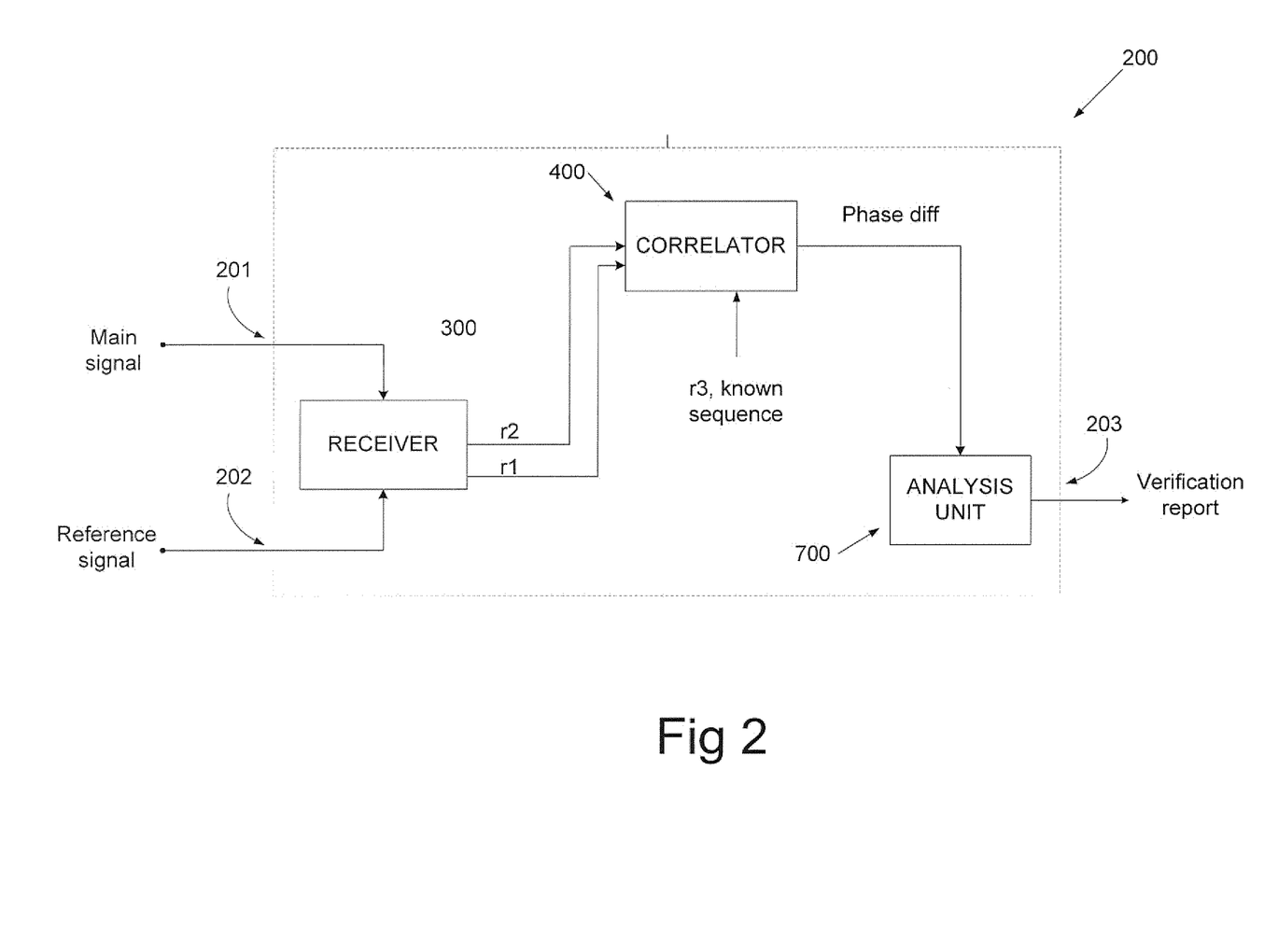
FIG. 2 shows a first embodiment of a verification device.

FIG. 2 shows a first embodiment of a verification device 200 of the invention. The verification device 200 comprises the first 201 and second 202 input ports shown in FIG. 1, arranged to receive the main and the reference signal, respectively. The verification device further comprises a communications receiver 300 as well as a correlator device 400 and an analysis unit 700. The output port 203 shown in FIG. 1 is also comprised in the verification device, and is arranged to output the verification report generated by the verification device 200. The communications receiver 300, of which an embodiment will be described in detail in connection to FIG. 3 below, is arranged to receive the main and the reference signal from the first 201 and the second 202 input port, respectively, and to output a first and a second filtered signal, shown as r1 and r2 in FIG. 2, respectively. A common reference signal is shown as r3 in FIG. 2.

The correlator device 400 is arranged to receive, from the communications receiver 300, the first and the second filtered signals, r1 and r2, and also the common reference signal r3. The correlator device 400 is further arranged to determine and to output a phase difference signal indicating the phase difference described in connection to FIG. 1 and a gain ratio signal indicating the gain ratio described in connection to FIG. 1. The analysis unit 700 is arranged to receive the gain ratio signal and the phase difference signal from the correlator device 400, and to also determine and output a verification report indicating successful or failed verification of the system 100, by means of the received phase difference signal and, in embodiments, the gain ratio signal, as will be explained in more detail below in connection to FIG. 7.

Figure 3:
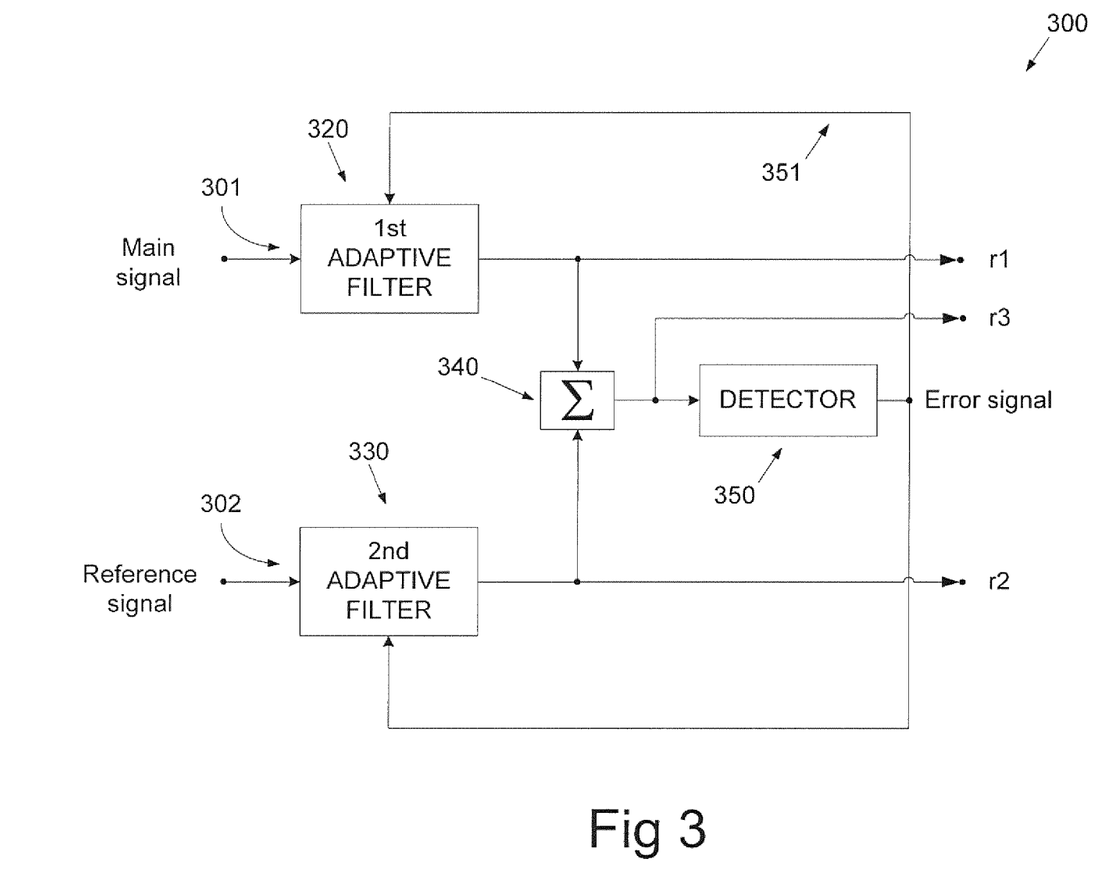
FIG. 3 shows a communications receiver.

FIG. 3 shows an embodiment of the communications receiver 300. The communications receiver 300 is arranged to suppress an interference component comprised in the main signal by means the reference signal. Thus, the communications receiver 300 is arranged to receive the main signal and a reference signal on a first 301 and a second 302 input port, respectively. The communications receiver 300 is further arranged to filter, by means of a first 320 and a second 330 adaptive filter comprised in the communications receiver 300, the received main and reference signals, respectively, in order to generate a first and a second filtered signal. The first and second filtered signals are shown in FIG. 3 as r1 and r2 respectively.

The first and second filtered signals are arranged to be added together by a signal adder 340 in order to create a common reference signal shown as r3 in FIG. 3. This common reference signal r3 is a signal where interference in the received main signal has been suppressed, as will be shown below. The common reference signal r3 which is the output signal of the signal adder 340 is arranged to be received by a detector device 350 comprised in the communications receiver 300, which detector device 350 is arranged to detect an information signal comprised in the main signal and possibly also in the reference signal. In the context of a SIMO system this information signal originates from the single transmitter antenna, while in the context of a MIMO system this information signal originates from one out of a plurality of transmit antennas. The detector device 350 is also arranged to generate and output an error signal. The error signal is suitably generated by determining the difference between the common reference signal r3 received by the detector 350 and the corresponding information signal detected by the detector 350.

In case the communications receiver 300 is used in the context of a SIMO system, then said interference comprised in the main signal and suppressed in the common reference signal may be an external interference, or may be non-existent, i.e. the verification device 200 does not need an interference signal to be present in order to have full functionality. In case the communications receiver 300 is used in the context of a MIMO system, then said interference comprises signals transmitted by all transmit antennas in the MIMO system other than the single antenna transmitting the information signal which the detector 350 is arranged to detect.

It should be pointed out that the common reference signal r3 can also be a sequence of known reference symbols, which is obtained from the received symbols by the communications receiver 300.

The information signal comprised in the main and reference signals, and also in the common reference signal, can be embodied in many different ways, one being a quadrature amplitude modulated, QAM, communications signal. Another example of an information signal which may be present in the main and reference signals and detected by the detector 350 is a known waveform, e.g. a sinusoid of known frequency.

The way in which the detector 350 detects the information signal will vary with the type of information signal that is comprised in the common reference signal. If, for example, the information signal is a QAM signal, the detector will usually compare samples of the common reference signal to a known signal constellation, and choose, for each sample, a closest constellation point to be a detected information symbol. The error signal is then determined as the difference between the chosen constellation point and the corresponding sample of the common reference signal.

It should be noted that the common reference signal will not be phase-aligned with the phase of signal originating from the transmitting unit 110. Due to, e.g., phase noise there will be a phase error in the common reference signal which must be compensated for prior to the detection in the detector 350. There are several ways to achieve this, one being the inclusion of a carrier recovery device, not shown in FIG. 3, in series with and prior to the detector 350. Such a carrier recovery device would phase align the common reference signal with the signal of the transmitting unit 110, preferably by means of the error signal, and possibly also by means of pilot symbols embedded in the information signal. The carrier recovery device may also be comprised in the detector unit 350. It should also be noted that the common reference signal usually is affected by linear distortion. Such linear distortion can be handled in several ways, one being the use of an equalizer unit, not shown in FIG. 3, to equalize the common reference signal prior to detection by the detector 350. The equalizer unit may be comprised in the detector 350.

The transfer functions of the first 320 and the second 330 adaptive filter are both arranged to be updated by means of the error signal generated by the detector unit 350, in order to minimize the magnitude of the error signal. In general, an interference suppression device, such as the interference suppression device made up by adaptive filters 320, 330 and the signal adder 340 shown in FIG. 3, is able to suppress interference in a received main signal by means of adaptive filtering and a received reference signal as long as there exists a correlation between the interference comprised in the main signal and the reference signal. The interference remaining in the detector input signal, here the common reference signal r3, will contribute to the magnitude of the error signal. Hence, minimizing the magnitude of the error signal is equivalent to suppressing interference in the common reference signal r3.

There are several methods available for the updating of adaptive filter transfer functions by means of a detection error signal, in order to minimize the magnitude of said error signal, examples of which include the least mean squares, LMS, and recursive least squares, RLS, methods.

The first and second filtered signals, r1 and r2, as well as the common reference signal r3 are arranged to be output signals of the communications receiver 300.

Figure 4:
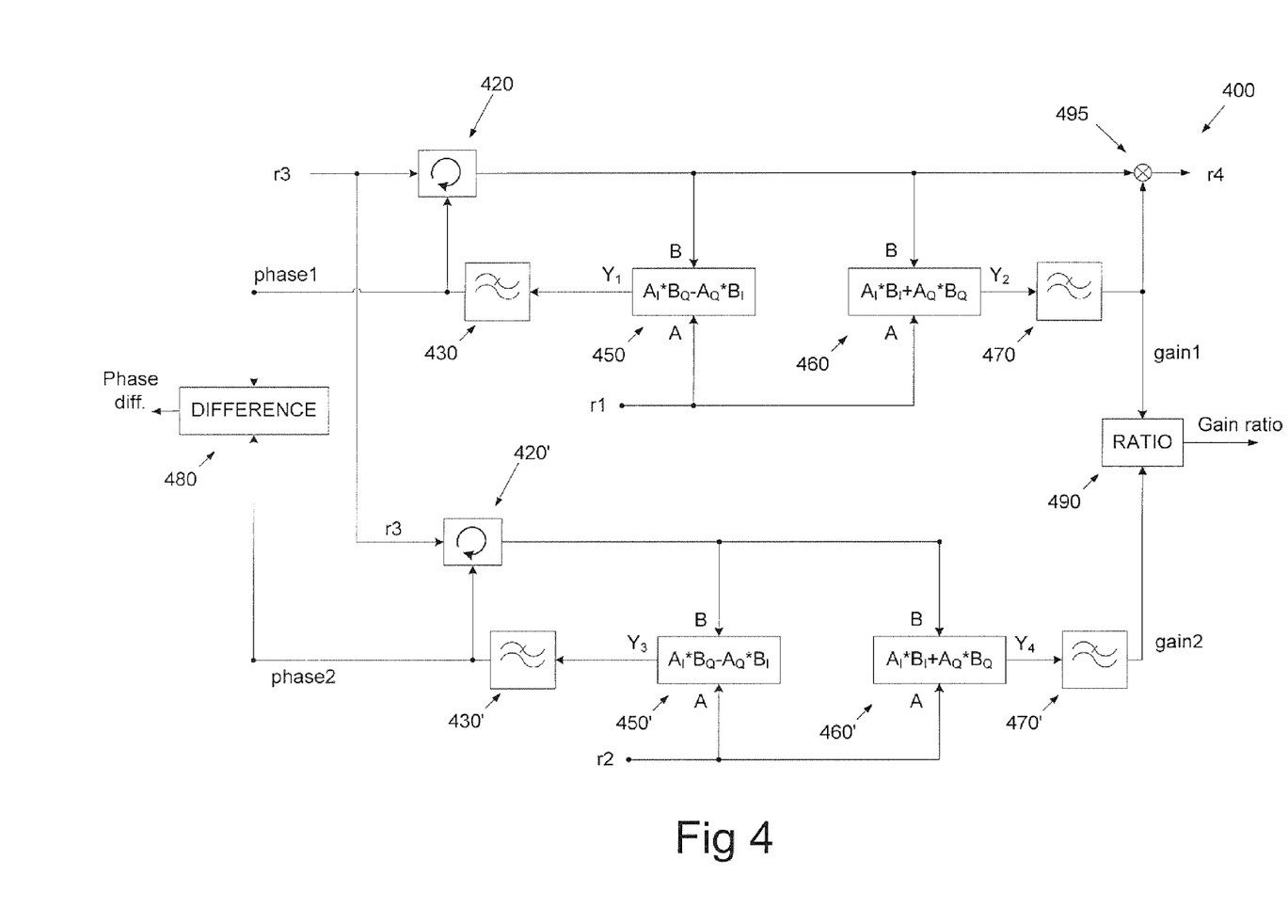
FIG. 4 shows a correlator device.

FIG. 4 shows an embodiment of the correlator device 400. As mentioned above, the correlator device 400 is arranged to receive first and second filtered signal, shown in FIG. 4 as r1 and r2 respectively, as well as a common reference signal, shown in FIG. 4 as r3. The correlator device 400 is further arranged to output a gain ratio signal and a phase difference signal, as well as an aligned common reference signal shown as r4 in FIG. 4.

The common reference signal r3 received by the correlator device is arranged to be an input signal to a first phase rotation device 420 arranged to receive the common reference signal r3, as well as a first phase rotation value, and to rotate the common reference signal by an amount determined by the first phase rotation value in order to generate a first processed common reference signal. The first processed common reference signal is arranged to be an input signal of a first 450 and a second 460 signal processing unit comprised in the correlator device 400.

The first signal processing unit 450 is arranged to receive the first processed common reference signal and also to receive the first filtered signal r1. The first signal processing unit 450 is further arranged to determine an output signal $Y_1$ according to the function $$Y_1 = A_{1I}*B_{1Q} - A_{1Q}*B_{1I},$$

where $Y_1$ is arranged to be the output signal of the first signal processing device 450, $(A_{1I}, A_{1Q})$ constitutes real and imaginary parts, respectively, of the first filtered signal, and $(B_{1I}, B_{1Q})$ constitutes real and imaginary parts, respectively, of the first processed common reference signal.

The output signal $Y_1$ of the first signal processing device 450 is arranged to be an input signal of a first low-pass filter 430 comprised in the correlator device 400. The first low-pass filter 430 is arranged to low-pass filter the output signal $Y_1$ of the first signal processing device in order to generate a first filtered $Y_1$ signal which first filtered $Y_1$ signal is arranged to be a first phase signal of the correlator device. The first filtered $Y_1$ signal output from the first low-pass filter 430 is also arranged to be the phase rotation value of the first phase rotation device 420.

The second signal processing unit 460 is arranged to receive the first processed common reference signal and also the first filtered signal r1. The second signal processing unit 450 is further arranged to determine an output signal $Y_2$ according to the function $$Y_2 = A_{1I}*B_{1I} + A_{1Q}*B_{1Q},$$

where $Y_2$ is arranged to be an output signal of the second signal processing device 460, $(A_{1I}, A_{1Q})$ constitutes real and imaginary parts, respectively, of the first filtered signal, and $(B_{1I}, B_{1Q})$ constitutes real and imaginary parts, respectively, of the first processed common reference signal.

The output signal $Y_2$ of the second signal processing device 460 is arranged to be an input signal to a second low-pass filter 470 comprised in the correlator device 400. The second low-pass filter 470 is arranged to low-pass filter the $Y_2$ signal in order to generate a filtered $Y_2$ signal, which filtered $Y_2$ signal is arranged to be a first gain signal of the correlator device.

The common reference signal r3 received by the correlator device is further arranged to be an input signal to a second phase rotation device 420' arranged to receive the common reference signal r3, as well as a second phase rotation value, and to rotate the common reference signal by an amount determined by the second phase rotation value in order to generate a second processed common reference signal. The second processed common reference signal is arranged to be an input signal of a third 450' and a fourth 460' signal processing unit comprised in the correlator device 400.

The third signal processing unit 450' is arranged to receive the second processed common reference signal and also to receive the second filtered signal r2. The third signal processing unit 450' is further arranged to determine an output signal $Y_3$ according to the function $$Y_3 = A_{2I}*B_{2Q} - A_{2Q}*B_{2I},$$

where $Y_3$ is arranged to be the output signal of the third signal processing device 450', $(A_{2I}, A_{2Q})$ constitutes real and imaginary parts, respectively, of the second filtered signal r2, and $(B_{2I}, B_{2Q})$ constitutes real and imaginary parts, respectively, of the second processed common reference signal.

The output signal $Y_3$ of the third signal processing device 450' is arranged to be an input signal of a third low-pass filter 430' comprised in the correlator device 400. The third low-pass filter 430' is arranged to low-pass filter the output signal $Y_3$ of the third signal processing device 450' in order to generate a filtered $Y_3$ signal which filtered $Y_3$ signal is arranged to be a second phase signal of the correlator device. The filtered $Y_3$ signal output from the third low-pass filter 430' is also arranged to be the phase rotation value of the second phase rotation device 420'.

The fourth signal processing unit 460' is arranged to receive the second processed common reference signal and also the second filtered signal r2.

The fourth signal processing unit 450' is further arranged to determine an output signal $Y_4$ according to the function $$Y_4 = A_{2I}*B_{2I} + A_{2Q}*B_{2Q},$$

where $Y_4$ is arranged to be an output signal of the fourth signal processing device 460', $(A_{2I}, A_{2Q})$ constitutes real and imaginary parts, respectively, of the second filtered signal r2, and $(B_{2I}, B_{2Q})$ constitutes real and imaginary parts, respectively, of the second processed common reference signal.

The output signal $Y_4$ of the fourth signal processing device 460' is arranged to be an input signal to a fourth low-pass filter 470' comprised in the correlator device 400. The fourth low-pass filter 470' is arranged to low-pass filter the $Y_4$ signal in order to generate a filtered $Y_4$ signal, which filtered $Y_4$ signal is arranged to be a second gain signal of the correlator device 400.

The correlator device 400 shown in FIG. 4 further comprises a difference device 480 and a ratio device 490. The difference device 480 is arranged to receive the first and the second phase signal from the first 430 and the third 430' low-pass filter, and to determine a phase difference signal as the difference between the first and the second phase signal. The difference device 480 is further arranged to output the phase difference signal as an output of the correlator device 400.

The correlator device 400 also comprises a ratio device 490 arranged to receive the first and the second gain signal, and to determine a gain ratio signal as the ratio between the first and the second gain signal. The ratio device is further arranged to output the determined gain ratio signal as an output signal of the correlator device 400.

The first processed common reference signal is arranged to be an input signal to a multiplier device 495 comprised in the correlator unit 400. The multiplier device 495 is arranged to multiply the first processed common reference signal by the first gain signal in order to determine the aligned common reference signal shown as r4 in FIG. 4, which aligned common reference signal r4 is arranged to be an output signal of the verification device 400.

Figure 5:
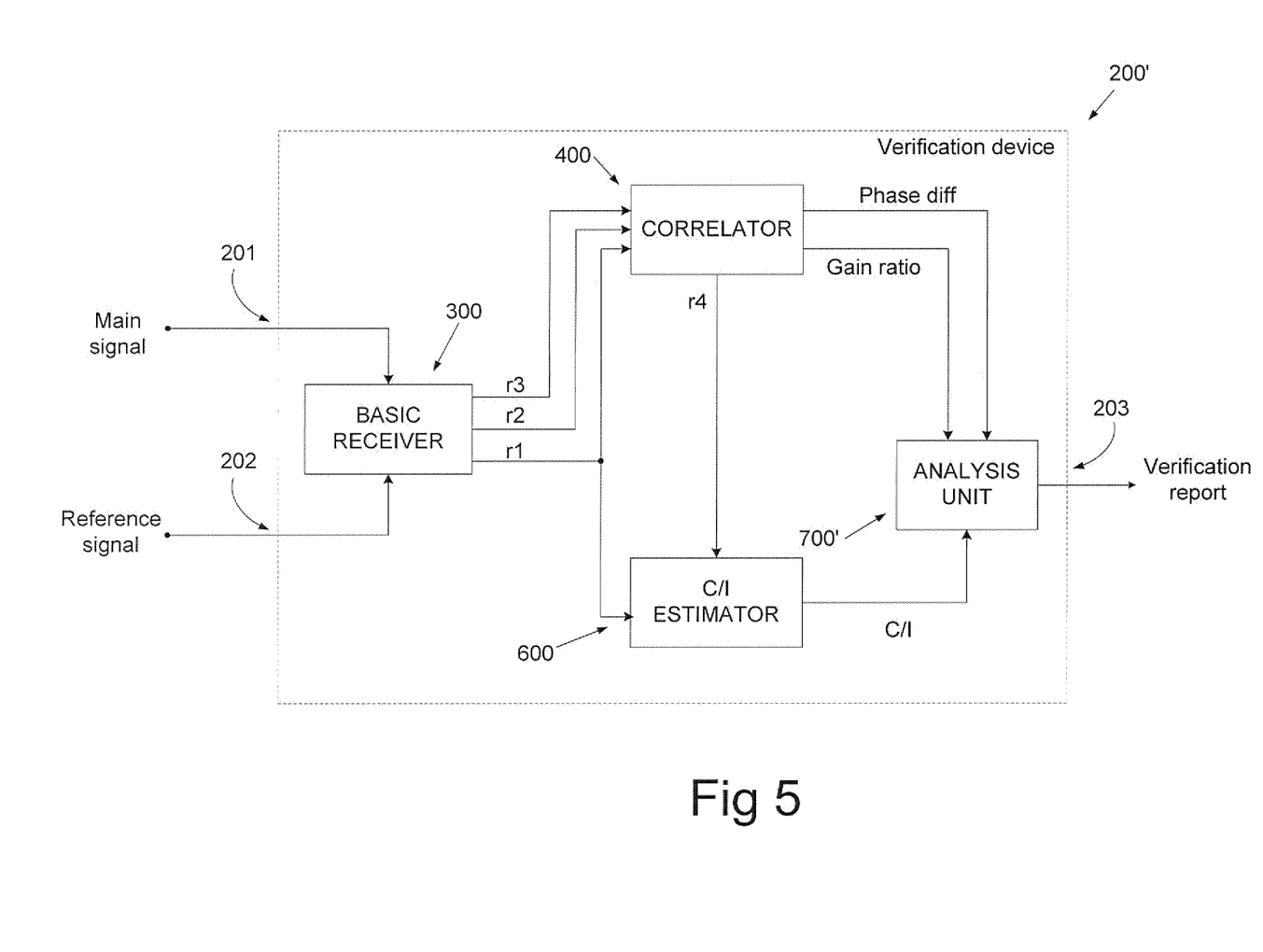
FIG. 5 shows a second embodiment of a verification device.

FIG. 5 shows a second embodiment of a verification device 200' of the invention, which embodiment 200' is an extension of the embodiment 200 shown in FIG. 2, for which reason components described in connection to the embodiment 200 will not be described in detail here again. However, the verification device 200' shown in FIG. 5 comprises the first 201 and second 202 input ports of the embodiment 200, as well as the communications receiver 300, the correlator device 400, and an analysis unit 700' with a slightly expanded function compared to the analysis unit 700 of FIG. 2. In similarity to the embodiment 200, an output port 203 is also comprised in the verification device 200', which output port 203 is arranged to output the verification report. In addition to the embodiment 200, the verification device 200' of FIG. 5 also comprises a carrier to interference ratio, C/I, estimator device 600. The C/I estimator device 600 is arranged to receive the first filtered signal r1 from the communications receiver unit 300 and to also receive the aligned common reference signal from the correlator device 400. The C/I estimator device 600, of which an embodiment is described in more detail in connection to FIG. 6 below, is arranged to determine a C/I ratio between a carrier signal received by the communications receiver 300 and any interference present on either of the at least two input ports 301, 302 of the communications receiver 300. The C/I estimator device 600 is further arranged to generate and output a C/I signal which is arranged to be an input signal to the analysis unit 700' comprised in the verification device 200', which analysis unit 700' will be described in detail below in connection to FIG. 7.

Figure 6:
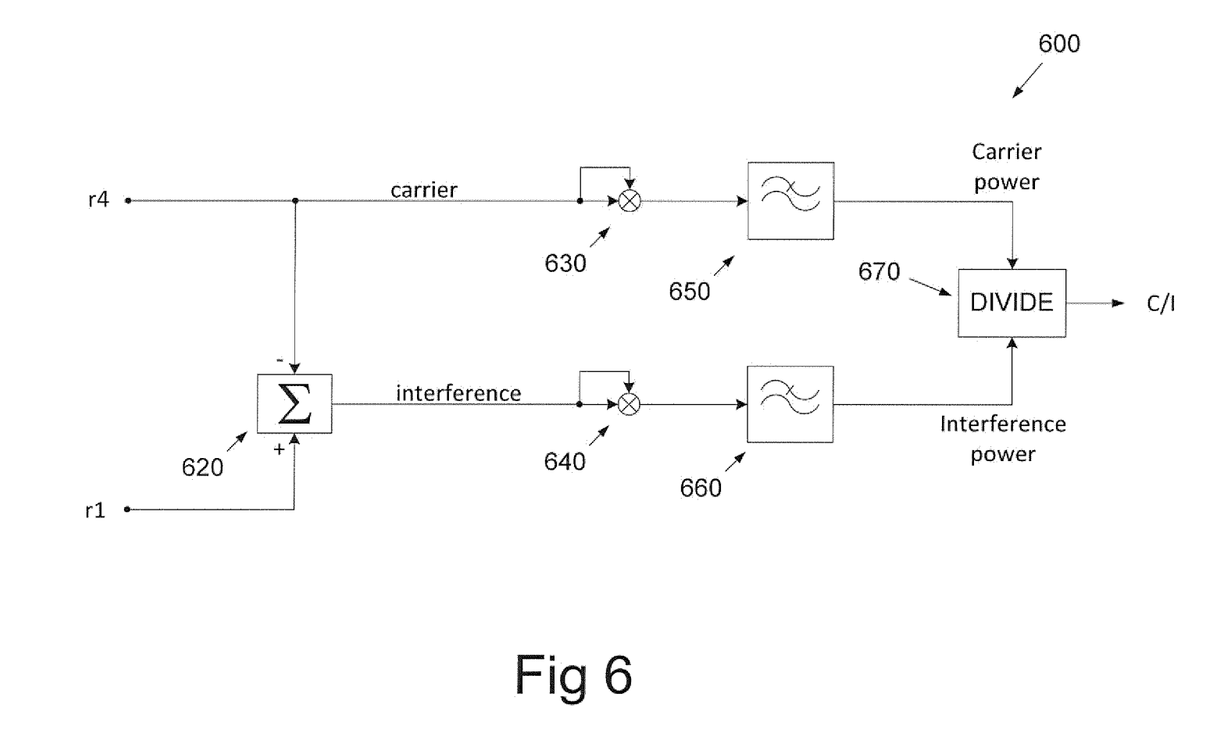
FIG. 6 shows a carrier to interference, C/I, estimator device.

FIG. 6 shows an embodiment of a C/I estimator device 600. The C/I estimator device 600 comprises input ports arranged to receive the first filtered signal r1 as well as the aligned common reference signal r4. The aligned common reference signal r4 will be referred to as the carrier signal when discussed in relation to FIG. 6. The C/I estimator device 600 further comprises a signal adder 620 arranged to receive and to add the first filtered signal r1 and the carrier signal, and to output the sum as an interference signal. The C/I estimator device 600 further comprises first 630 and second 640 means for determining the power of an input signal. The first 630 means for determining the power of an input signal is arranged to determine the power of the carrier signal and to output a carrier power signal. The second 640 means for determining the power of an input signal is arranged to determine the power of the interference signal, and to output an interference power signal. The determined carrier power and interference power signals are then arranged to be low-pass filtered by a first 650 and a second 660 low-pass filter comprised in the C/I estimator device 600. The C/I signal output from the C/I estimator device is arranged to be determined, by means of a divider 670, as the ratio between the low-pass filtered carrier power signal and the low-pass filtered interference power signal.

Figure 7:
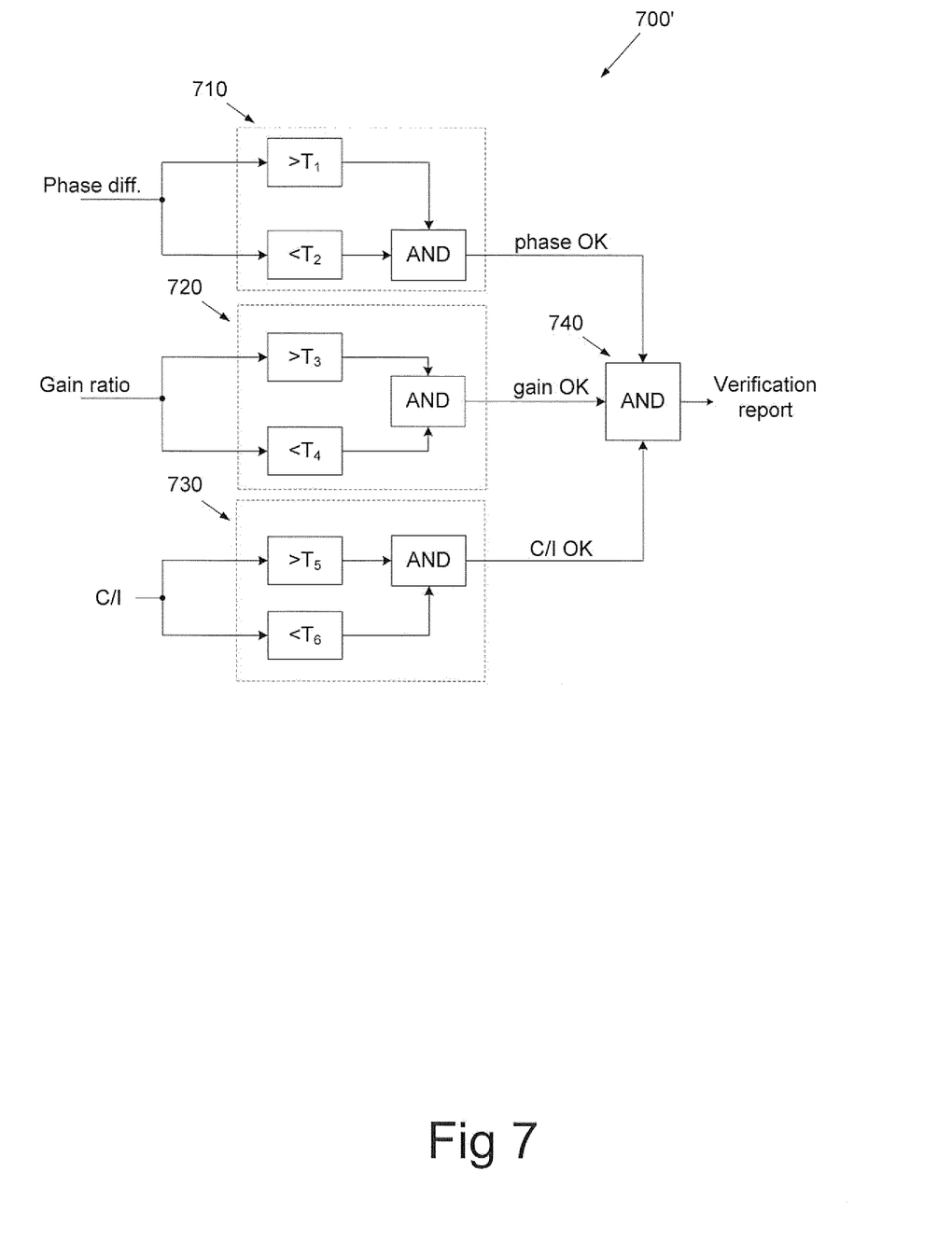
FIG. 7 shows an embodiment of an analysis device.

FIG. 7 shows an embodiment of an analysis device 700' of the invention. The analysis device 700' comprises input ports arranged to receive the phase difference signal and the gain ratio signal, as well as the C/I signal. The analysis device 700' also comprises an output port arranged to output a verification report as a verification report signal. The analysis unit 700' also comprises a first 710 and a second 720 as well as a third 730 range comparison device. The first 710 range comparison device is arranged to compare the received phase difference signal to a first range of allowable values. The second 720 range comparison device is arranged to compare the received gain ratio signal to a second range of allowable values. The third 723 range comparison device is arranged to compare the received C/I signal to a third range of allowable values. The analysis device 700' is also arranged to generate and to output a verification report, which verification report is arranged to indicate successful verification of the system 100 if both the phase difference signal and the gain ratio signal, as well as the C/I signal are within their respective ranges of allowed values. For this purpose the embodiment shown in FIG. 7 comprises an 'AND' device 740, but this is only to be construed as an example. As will be noted, the analysis device 700 of FIG. 2 has not been described as "in depth" as the analysis device 700' of FIG. 7. However, by means of the description of the analysis device 700', one skilled in the art will be able to realize an embodiment of the analysis device 700: an embodiment of the analysis device 700 can be obtained by omitting the third 730 range comparison device.

Figure 8:
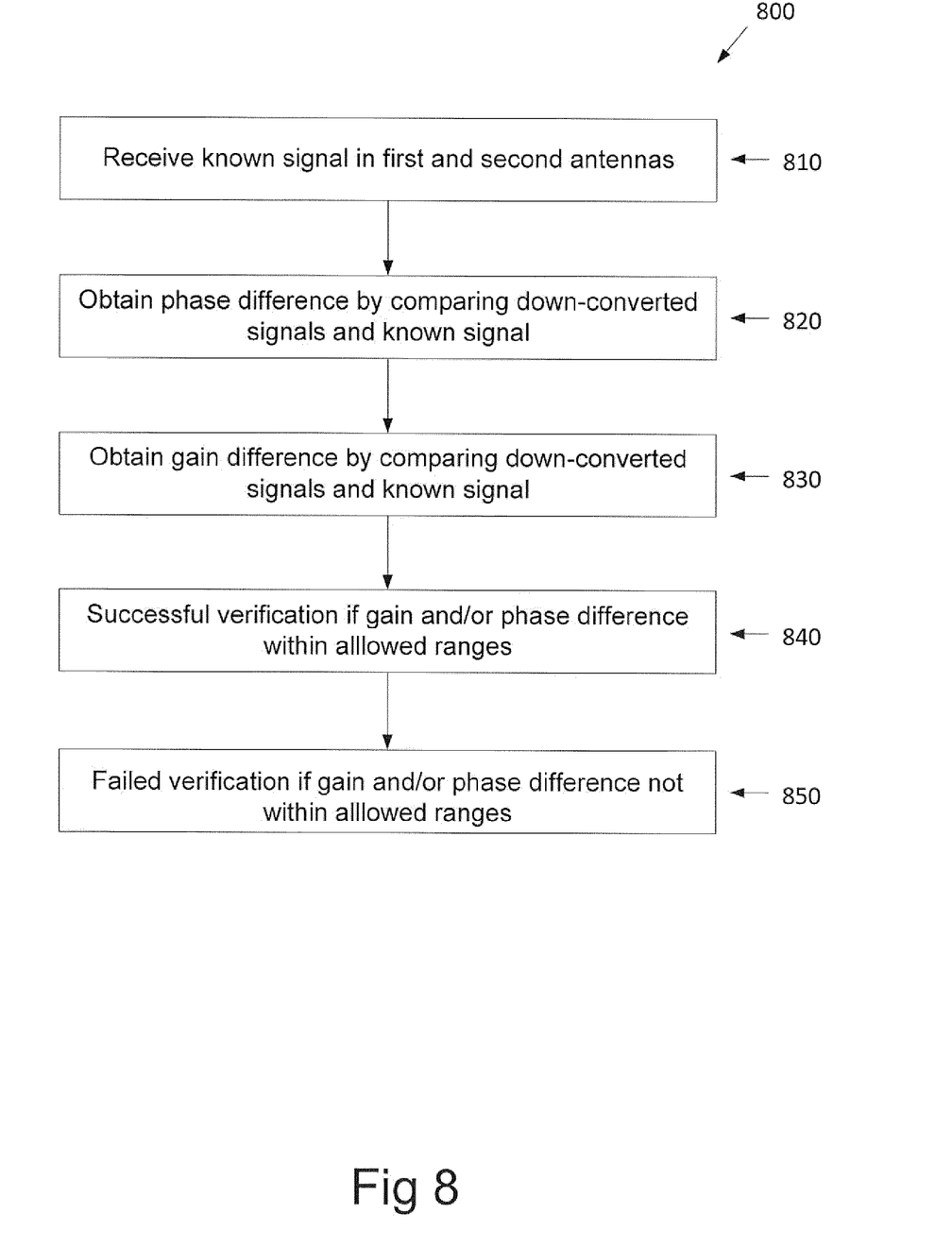
FIG. 8 shows a flowchart of a method of the invention.

FIG. 8 shows a schematic flow chart of a method 800 for use in verifying a LOS MIMO/SIMO system. The method 800 for verification of a LOS MIMO/SIMO system comprises the steps of:

receiving, step 810, a signal with reference signals from at least one transmit antenna in the LOS MIMO/SIMO system in a first receive antenna which is connected to a down converter arranged to output a first down converted signal and in a second receive antenna which is connected to a down converter arranged to output a second down converted signal, obtaining the phase difference, step 820, between the first signal as received in the first and second receive antennas by comparing the first down-converted signal and the second down-converted signal with the reference symbols.

In embodiments, the method 800 comprises, step 830, obtaining the gain ratio between the first signal as received in the first and second antennas respectively by comparing the first down-converted signal and the second down-converted signal with the reference symbols.

In embodiments, the method 800 comprises, step 840, indicating successful verification of the LOS MIMO/SIMO system if said phase difference and/or gain ratio are within respective ranges of allowed values, and otherwise, step 850, indicating failed verification of the LOS MIMO/SIMO system.

An ideal LOS MIMO/SIMO system will have a phase difference between signals of exactly 90 degrees, and, where the gain ratio is used, a gain ratio of 0 dB. However, one cannot expect all LOS MIMO/SIMO systems to exhibit such perfection. Hence, some margin is needed in the allowed ranges. The margin can vary, and will be determined by the user of the system based on system requirements. Nevertheless, a suitable range of values for the phase difference may be on the order of 80-100 degrees for some LOS MIMO/SIMO systems, while a suitable range of allowed values for the gain ratio may be on the order of −3 dB to 3 dB for some LOS MIMO/SIMO systems.

In embodiments, the method 800 further comprises the steps of:

using the output signal from the down converter in one of said receive chains as a main signal.

using the output signal from the down converter in the other of said receive chains as a reference signal, adaptive filtering of the main signal and of the reference signal in order to generate first and second filtered signals, respectively, adding the first and second filtered signals and using their sum as a common reference signal with said reference symbols.

It should be pointed out that the common reference signal r3 can also be a sequence of known reference symbols, which is obtained from the received symbols by the communications receiver 300.

In embodiments, the method 800 further comprises the steps of:
  detecting a communications signal comprised in the common reference signal,
  determining an error signal by means of comparing the common reference signal to the detected communications signal,
  updating the transfer functions of the first and second adaptive filters by means of said error signal.

In embodiments, the method 800 further comprises the steps of:
  determining a first correlation value as the correlation between the first filtered signal and the common reference signal, and
  determining a second correlation value as the correlation between the second filtered signal and the common reference signal,
  determining the difference in phase between the first and second received radio signals as the difference in phase between the first and second correlation value,
  determining the ratio between the gain of the first and second received radio signals as the ratio in amplitude between the first and second correlation value,
  generating a phase difference signal from the determined difference in phase between the first and second received radio signals,
  generating a gain ratio signal from the determined ratio between the gain of the first and second received radio signals.

In embodiments, the method 800 further comprises the steps of:
  using the first correlation value to phase align the common reference signal with the first filtered signal,
  using the first correlation value to gain align the common reference signal with the first filtered signal,
  generating an aligned common reference signal from the phase and gain aligned common reference signal,
  using the power of the aligned common reference signal as a carrier power value,
  determining the interference power value as the power of the difference between aligned common reference signal and the first filtered signal,
  determining a Carrier to Interference power value, C/I, as the ratio between the carrier power value and the interference power value, and generating a C/I signal from said C/I.

In embodiments, the method 800 further comprises determining if the C/I signal is within a range of allowable values or not, as well as outputting a verification report which indicates successful verification of the LOS MIMO/SIMO system if the CI signal and the phase difference signal and/or the gain ratio signal are within respective ranges of allowed values, and otherwise outputting a verification report which indicates failed verification of the LOS MIMO/SIMO system.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A verification device for verification of a Line of Sight (LOS) Multiple-Input Multiple-Output/Single-Input Multiple-Output (MIMO/SIMO) system wherein the LOS MIMO/SIMO system includes at least one transmitter unit connected to at least a first transmit antenna, the LOS MIMO/SIMO system also includes a first receive antenna connected to a first down-converter arranged to output a first down converted signal and a second receive antenna connected to a second down-converter arranged to output a second down-converted signal, said first and second receive antennas being arranged to receive a first signal with reference symbols transmitted from at least one of said at least first transmit antenna, the verification device being arranged:
  to obtain a phase difference between the first signal as received in the first and second receive antennas respectively by comparing the first down-converted signal and the second down-converted signal with the reference symbols; and
  to obtain a gain ratio between the first signal as received in the first and second antennas respectively by comparing the first down-converted signal and the second down-converted signal with the reference symbols.

2. The verification device of claim 1, being arranged to indicate successful verification of the LOS MIMO/SIMO system if at least one of said phase difference and said gain ratio are within respective ranges of allowed values, and to otherwise indicate failed verification of the LOS MIMO/SIMO system.

3. The verification device of claim 1, comprising:
  a communications receiver arranged to receive the first down converted signal from the first down converter as a main signal and to receive the second down converted signal from the second down converter as a reference signal, the communications receiver including a first adaptive filter arranged to receive the main signal and a second adaptive filter arranged to receive the reference signal, said first and second adaptive filters being arranged to output a first and a second filtered signal, respectively, the communications receiver further comprising an adder adapted to add the first and the second filtered signals, the verification device being arranged to use the sum of the first and the second filtered signals as a common reference signal comprising the reference symbols.

4. The verification device of claim 3, wherein the communications receiver further comprising a detector arranged to receive the common reference signal and to detect a communications signal comprised in the common reference signal, the detector also being arranged to generate an error signal by comparing the common reference signal to the detected communications signal, and wherein transfer functions of the first and the second adaptive filters are arranged to be updated by means of said error signal.

5. The verification device of claim 4, in which the first and second filtered signals as well as the common reference signal are complex signals, and the verification device further comprises:
a correlator unit arranged to receive said first and second filtered signals from the adaptive filters and to also receive the common reference signal, the correlator unit further being arranged to determine as a first correlation value a correlation between the first filtered signal and the common reference signal and a second correlation value as a correlation between the second filtered signal and the common reference signal, and to determine a difference in phase between the first and second received signals as a difference in phase between the first and second correlation value, and to determine a ratio between a gain of the first and second received signals as the ratio in amplitude between the first and second correlation value, the correlator unit further being arranged to output the determined difference in phase between the first and second received signals as a phase difference signal, and also to output the determined ratio between the gain of the first and second received signals as a gain ratio signal.

6. The verification device of claim 5, wherein the correlator device is arranged to use the first correlation value to phase align the common reference signal with the first filtered signal and to use the first correlation value to gain align the common reference signal with the first filtered signal and to output the phase and gain aligned common reference signal as an aligned common reference signal.

7. The verification device of claim 6, further comprising:
a Carrier to Interference (CI) estimator device which is arranged to receive the first filtered signal from the first adaptive filter and the aligned common reference signal from the correlator device, the C/I estimator device being arranged to use a power of the aligned common reference signal as a carrier power value, and to determine an interference power value as a power of the difference between aligned common reference signal and the first filtered signal, the C/I estimator device being arranged to determine a C/I value as a ratio between the carrier power value and the interference power value, and to output said C/I value as a C/I signal.

8. The verification device of claim 7, further arranged to determine whether the received C/I signal is within a range of allowable values, and to indicate successful verification of the LOS MIMO/SIMO system if at least one of the received C/I signal, the phase difference signal and the gain ratio signal are within their respective ranges of allowed values, and to otherwise output a verification report which indicates failed verification of the LOS MIMO/SIMO system.

9. A method for verification of a Line of Sight (LOS) Multiple-Input Multiple-Output/Single-Input Multiple-Output (MIMO/SIMO) system, the method comprising:
receiving a first signal with reference symbols from at least one transmit antenna in the LOS MIMO/SIMO system in a first receive antenna connected to a down converter arranged to output a first down-converted signal and in a second receive antenna connected to a down converter arranged to output a second down-converted signal;
obtaining a phase difference-between the first signal as received in the first and second receive antennas by comparing the first down-converted signal and the second down-converted signal with the reference symbols; and
obtaining a gain ratio between the first signal as received in the first and second antennas respectively by comparing the first down-converted signal and the second down-converted signal with the reference symbols.

10. The method of claim 9, further comprising:
indicating successful verification of the LOS MIMO/SIMO system if at least one of said phase difference and said gain ratio are within respective ranges of allowed values, and otherwise indicating failed verification of the LOS MIMO/SIMO system.

11. The method of claim 9, further comprising:
using the first down converted signal from the first down converter as a main signal;
using the second down converted signal from the second down converter as a reference signal;
adaptive filtering of the main signal and of the reference signal to generate first and second filtered signals, respectively; and
adding the first and second filtered signals and using their sum as a common reference signal with said reference symbols.

12. The method of claim 11, further comprising:
detecting a communications signal comprised in the common reference signal;
determining an error signal by comparing the common reference signal to the detected communications signal; and
updating transfer functions of the first and second adaptive filters by means of said error signal.

13. The method of claim 12, further comprising:
determining a first correlation value as a correlation between the first filtered signal and the common reference signal;
determining a second correlation value as a correlation between the second filtered signal and the common reference signal;
determining a difference in phase between the first and the second received radio signals as the difference in phase between the first and second correlation value;
determining a ratio between a gain of the first and the second received radio signals as the ratio in amplitude between the first and second correlation value;

generating a phase difference signal from the determined difference in phase between the first and the second received radio signals; and generating a gain ratio signal from the determined ratio between the gain of the first and the second received radio signals.

14. The method of claim 13, further comprising the steps of:

using the first correlation value to phase align the common reference signal with the first filtered signal;

using the first correlation value to gain align the common reference signal with the first filtered signal;

generating an aligned common reference signal from the phase and the gain aligned common reference signal;

using the power of the aligned common reference signal as a carrier power value;

determining an interference power value as the power of the difference between the aligned common reference signal and the first filtered signal; and determining a Carrier to Interference (C/I) power value as the ratio between the carrier power value and the interference power value, and generating a C/I signal from said C/I.

15. The method of claim 14, further comprising:

determining if the C/I signal is within a range of allowable values; and outputting a verification report which indicates successful verification of the LOS MIMO/SIMO system when at least one of the CI signal, the phase difference signal and the gain ratio signal are within respective ranges of allowed values, and otherwise outputting a verification report which indicates failed verification of the LOS MIMO/SIMO system.

\* \* \* \* \*